No. 815,279. PATENTED MAR. 13, 1906.
H. C. FOLGER.
VEHICLE TIRE.
APPLICATION FILED MAY 19, 1905.
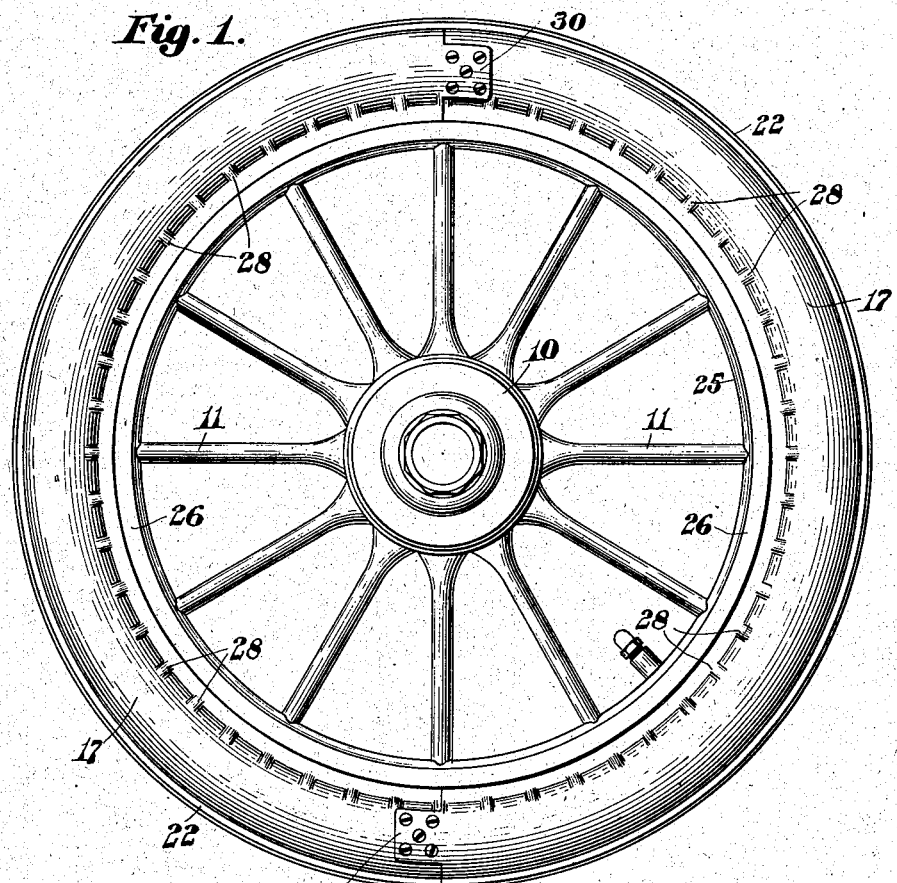
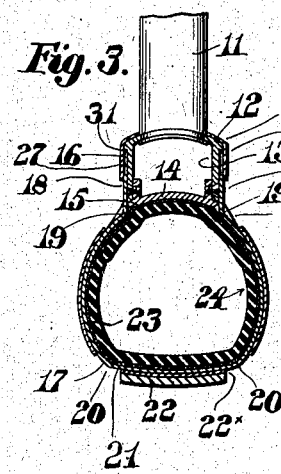 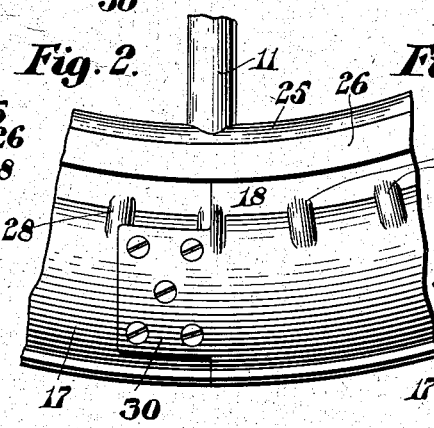 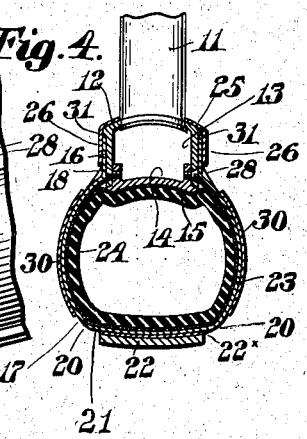
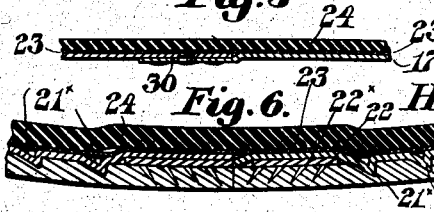
Witnesses:  Inventor:
Henry C. Folger,
by Walter E. Lombard,
Atty.

UNITED STATES PATENT OFFICE.

HENRY C. FOLGER, OF WEST SOMERVILLE, MASSACHUSETTS.

VEHICLE-TIRE.

No. 815,279.　　　Specification of Letters Patent.　　Patented March 13, 1906.

Application filed May 19, 1905. Serial No. 261,154.

*To all whom it may concern:*

Be it known that I, HENRY C. FOLGER, a citizen of the United States of America, and a resident of West Somerville, in the county of Middlesex and State of Massachusetts, have invented certain new and useful Improvements in Vehicle-Tires, of which the following is a specification.

This invention relates to vehicle-tires, and has for its object the production of a tire which will thoroughly protect the inner or pneumatic tube from puncture, which will reduce the creeping of the tire on the felly to a minimum, and which will reduce materially the jouncing caused when passing over an uneven road-bed.

The invention consists in certain novel features of construction and arrangement of parts which will be readily understood by reference to the description of the drawings and to the claims to be hereinafter given.

Of the drawings, Figure 1 represents an elevation of a wheel embodying the features of this invention. Fig. 2 represents an elevation of a small portion of the felly and tire of said wheel, drawn to an enlarged scale. Fig. 3 represents a transverse section of the same. Fig. 4 represents a similar view with the tire depressed, and Figs. 5 and 6 represent details to be hereinafter described.

Similar characters designate like parts throughout the several figures of the drawings.

In the drawings, 10 represents a hub of a motor-carriage wheel of the artillery type, said hub being provided with a plurality of radiating artillery-spokes 11. These spokes 11 support a felly 12, which is shown in the drawings as composed of an annular U-shaped rim 13, the open side of which is closed by means of the annular member 14, provided with flanges interposed between the side cheeks of said felly and abutting the same. The outer perimeter of said member 14 is suitably concaved and has secured thereto a lining of canvas or other flexible non-metallic material 15, the ends of which extend considerably beyond the faces 16 of said felly. A rigid metallic tire 17 is provided with parallel members 18, the inner faces of which are adapted to abut the faces 16 of the felly, which is interposed between said parallel members 18. The main portion of said rigid tire member 17 is curved from 19 to 20 in continuation of the curvature of the external perimeter of the felly 12 when said tire is in its normal position. The outer perimeter of said member 17 is flattened to some extent from 20 to 20 to provide a suitable tread-surface for said tire. This flattened portion 21 has secured thereto by the projections 21* extending from said tube 17 a leather tread member 22 of any suitable construction, the ends of which are secured together by a plate 22*, provided with a plurality of projections engaging therewith. The interior of the member 17 is provided with a canvas or other non-metallic flexible lining 23, extending from 19 to 19 and overlapping the ends of the lining 15, secured to the felly member 14. Within this lining 15 23 is located a pneumatic or inner tube 24, which is supported by the felly 12 and when inflated retains the tire 17 in normal position, as shown in Fig. 3.

The felly 12 has secured thereto a U-shaped member 25, having parallel cheek-plates 26, which extend over the edges of the parallel members 18 of the tire, and thereby form with the felly recesses 27, in which said members 18 are adapted to move toward the center of the wheel during the revolution of the wheel. The members 18 nicely fit the recesses 27 and are adapted to prevent dirt or moisture from gaining access to the interior of said metallic tire. The linings 15 23 overlap one another and protect the inner tube 24 when the member 17 moves on the felly 12 toward the center.

The member 17 is provided with a plurality of radial creases 28, which stiffen the members 18 and prevent them from separating, the cheek-plates 26 of the U-shaped member 25 also assisting to this end. As the wheel revolves under the weight of a carriage successive portions of the members 18 of the tire 17 reciprocate in the recesses 27 while the inner tube 24 is being compressed and again expanded. This tire thoroughly protects the inner tube and prevents it from being punctured, and in view of such protection a much lighter inner tube may be used than is ordinarily the case.

The linings interposed between the outer metallic tube or tire and the inner pneumatic tube is such as to prevent injury to the interior tube. On ordinary tires sand and fine pebbles will sometimes work into the tire and gradually work their way through, perforating the same to their manifest injury; but in the present case the inner or flexible tube is removed entirely from contact with such injurious substances. In fact, the inner tube acts in the same manner as an ordinary tire and has for its bearing-surface the armored tube or tire on which it practically moves, picking up each portion over which it passes as soon as such passage has been made. This operation permits the outer rigid metallic tire to bridge over crevices and cavities over which the carriage may be passing, while the inner tube simply moves over the bridge formed thereby. It is obvious that such an action as this will prevent the greater part of the jar and jouncing which is generally given a car passing over uneven pavements and rough roads.

The metal tire or tube 17 is made in two semi-annular sections, each of which is provided with an extension 30, by which it is to be secured by brazing, rivets, or otherwise to the opposite end of the companion section.

The side faces 16 of the felly 12 are each provided with a limiting shoulder or stop 31, with which the inner edge of the parallel members 18 are adapted to coöperate when the inner pneumatic tube 24 is collapsed on account of leakage of the air therefrom or injury thereto. It is obvious that when this occurs the carriage may be driven home on the metal tube members 17.

It is believed from the foregoing that the description of the invention will be thoroughly understood without further explanation.

Having thus described my invention, I claim—

1. In a vehicle-tire, in combination with a felly of a wheel, an annular metal tube provided with parallel members coöperating with the sides of said felly, a flexible non-metallic lining secured to the exterior perimeter of said felly, and a pneumatic tube within said metal tube supported by said felly.

2. In a vehicle-tire, in combination with a felly of a wheel, an annular metal tube provided with parallel members coöperating with the sides of said felly, a flexible non-metallic lining secured to the exterior perimeter of said felly, said lining extending beyond either side of said felly, and a pneumatic tube within said metal tube supported by said felly.

3. In a vehicle-tire, in combination with a felly of a wheel, an annular metal tube provided with parallel members coöperating with the sides of said felly, a pneumatic tube within said metal tube and supported by said felly, and a flexible non-metallic lining interposed between said tubes.

4. In a vehicle-tire, in combination with a felly of a wheel, an annular metal tube provided with parallel members coöperating with the sides of said felly, a pneumatic tube within said metal tube and supported by said felly, and a U-shaped member secured to said felly with the parallel members thereof overlapping the parallel members of said metal tube.

5. In a vehicle-tire, in combination with a felly of a wheel, an annular metal tube provided with parallel members coöperating with the sides of said felly, a pneumatic tube within said metal tube and supported by said felly, and flexible non-metallic members secured to the interior of said metal tube and the exterior of said felly and overlapping one another.

6. In a vehicle-tire, in combination with a felly of a wheel, two semi-annular metal tube members each provided with an extension adapted to be secured to the opposite end of the companion member and having parallel members coöperating with the sides of said felly, and a pneumatic tube within said metal tube members supported by said felly.

7. In a vehicle-tire, in combination with a felly of a wheel, two semi-annular metal tube members each provided with an extension adapted to be secured to the opposite end of the companion member and having parallel members coöperating with the sides of said felly, a pneumatic tube within said metal tube members supported by said felly, and means for stiffening said parallel members.

8. In a vehicle-tire, in combination with a felly of a wheel, two semi-annular metal tube members each provided with an extension adapted to be secured to the opposite end of the companion member and having parallel members coöperating with the sides of said felly, a pneumatic tube within said metal tube members supported by said felly, and radial corrugations in said metal tube for stiffening said parallel members.

9. In a vehicle-tire, in combination with a felly of a wheel, an annular metal tube provided with a plurality of projections, and a tread member of flexible non-metallic material secured to said tube by said projections.

Signed by me at Boston, Massachusetts, this 15th day of May, 1905.

HENRY C. FOLGER.

Witnesses:
WALTER E. LOMBARD,
EDNA C. CLEVELAND.